United States Patent [19]

Usagida

[11] 3,995,746

[45] Dec. 7, 1976

[54] HYDRAULIC CRANE MECHANISM OPERABLE TO PROVIDE ENLARGED PARALLEL MOVEMENT

[75] Inventor: Sadahiko Usagida, Kobe, Japan

[73] Assignee: Ohji Seiki Kogyo Kabushiki Kaisha, Kobe, Japan

[22] Filed: June 10, 1974

[21] Appl. No.: 477,866

[30] Foreign Application Priority Data

July 27, 1973 Japan .............................. 48-84767

[52] U.S. Cl. ............................ 214/1 BD; 212/8 A; 212/28; 214/DIG. 10; 214/147 T; 214/1 CM; 212/58 R

[51] Int. Cl.[2] ...................... B25J 3/00; B66C 23/00

[58] Field of Search ............. 212/8 R, 28, 35, 58 R, 212/8 A, 8 B; 214/1 CM, 1 BD, DIG. 10, 147 R, 147 G, 147 T, 147 AS, 77 R, 77 P

[56] References Cited

UNITED STATES PATENTS

| | | | |
|---|---|---|---|
| 3,262,593 | 7/1966 | Hainer | 214/1 CM X |
| 3,630,389 | 12/1971 | Schmidt et al. | 214/1 CM |
| 3,703,968 | 11/1972 | Ulrich et al. | 214/147 T |

FOREIGN PATENTS OR APPLICATIONS

| | | | |
|---|---|---|---|
| 1,458,379 | 10/1966 | France | 214/1 CM |
| 1,083,476 | 6/1954 | France | 214/1 CM |

*Primary Examiner*—Robert J. Spar
*Assistant Examiner*—R. B. Johnson
*Attorney, Agent, or Firm*—Frank J. Jordan

[57] ABSTRACT

A hydraulic crane includes a pair of boom arms and a pair of swing arms pivotally connected in association with a pair of auxiliary arms and arranged in the form of a pantograph. Substantially horizontal or vertical displacement of one of the pivotal connections by hydraulic piston devices will effect correspondingly substantially horizontal and vertical displacement respectively, but to a larger degree, of a swing means from which a cargo load may be suspended or to which an excavating shovel or the like may be attached.

1 Claim, 3 Drawing Figures

HYDRAULIC CRANE MECHANISM OPERABLE TO PROVIDE ENLARGED PARALLEL MOVEMENT

BACKGROUND OF THE INVENTION

This invention relates to a crane mechanism and more particularly to a crane mechanism having a swing arm which can be readily controlled by an operator to position the swing arm at desired positions.

Whereas heretofore various known crane devices operated to carry a load along generally circular or arcuate paths due to the pivotal mounting of the crane boom or swing arm, the mechanism of the present invention is operable to provide substantially straight horizontal or vertical movements of the load carried by the crane so that the crane operator can readily predict the path of travel of the load.

The principles of the present invention may be incorporated into cranes, servo arms, excavating machinery or other similar types of devices. By way of example, when incorporated into a servo arm, the latter may be used in industry and operated by one man to lift and move heavy parts which are being machined, pressed, assembled or otherwise worked on, the operation of the servo arm being such that the single operator can effect lifting and moving of such items along controlled and readily predictable paths of travel.

The principles of the present invention may be incorporated in a crane mechanism, utilizing a pantograph link mechanism in connection with a derrick crane or the like and having a crane boom, a swing arm pivotally connected to an end of the crane boom, and two associated arms which are so disposed as to form a pantograph or parallelogramic link mechanism. The associated arms are disposed parallel to the boom and swing arm respectively and are pivotally connected mutually at the parts of their intersection, so that displacement of the connecting part of the associated arms will cause a larger corresponding displacement of the lower end of the swing arm.

The crane boom consists of two parallel boom arms of equal length while the swing arm consists of two parallel arms of equal length. The pair of boom arms and the pair of swing arms are pivotally connected to a connecting member. The lower end of the two swing arms are pivotally connected to a swing means, whereby a line connecting the pivotal connection of the two swing arms to the connecting member is parallel to and equal in length to a line connecting the pivotal connection of the swing arms to the swing means, and the aforementioned lines are maintained at a horizontal disposition or at a certain angle at all times.

Other features which are considered as characteristic for the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

SUMMARY OF THE INVENTION

A hydraulic crane mechanism includes a rotatably mounted support means on which a pair of boom arms of equal length are pivotally mounted. A connecting member is pivotally connected to the boom arms such that the latter are maintained in spaced parallel relationship. A pair of equal length swing arms are pivotally connected to the connecting member and a swing means pivotally connects the swing arms such that the latter are maintained in spaced parallel disposition. A first associated arm is pivotally connected to an intermediate section of one of the boom arms and is disposed parallel to the swing arm. A second associated arm is pivotally connected to an intermediate section of one of the swing arms and is disposed parallel to the boom arm. Pivotal means pivotally connect the first and second associated arms such that portions of the boom arm and swing arm along with the two associated arms form a pantograph. Operable means such as hydraulic pistons are provided to displace the pivotal means whereby displacement of the latter in substantially horizontal or vertical directions will effect correspondingly substantially horizontal and vertical displacement respectively, but to a larger degree, of the swing means from which a cargo load may be suspended or to which an excavating shovel or the like may be attached.

DESCRIPTION OF THE PREFERRED EMBODIMENTS

Figure 1:
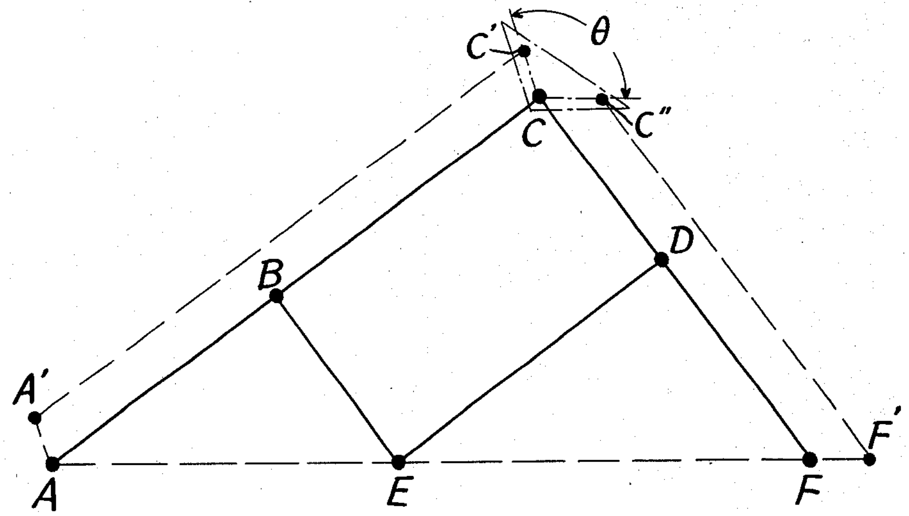
FIG. 1 is a diagrammatic illustration of the pantograph mechanism presented to facilitate explanation of the constructional and operational features of the present invention.

Referring first to FIG. 1, the relatively thicker lines $\overline{AC}$, $\overline{CF}$, $\overline{DE}$ and $\overline{BE}$ represent a pantograph-like or parallelogrammic link mechanism. $\overline{AC}$ represents a crane boom arm and $\overline{CF}$ represents a swing arm from which a load is suspended. $\overline{BE}$ and $\overline{DE}$ represent associated arm members which are parallel to $\overline{CF}$ and $\overline{AC}$ respectively. Point E represents a joint pin for coupling or pivotally connecting the associated arm members $\overline{BE}$ and $\overline{DE}$. Movement or displacement of point E will cause a correspondingly larger movement or displacement of the lower end F of the swing arm $\overline{CF}$. It is further noted that if point E is moved or displaced along a straight line path, point F will also be moved, not only for a greater distance than point E, but also along a straight line path or locus.

Generally speaking, with conventional cranes, up and down movement of a crane boom will cause a circular movement of the longitudinal end or nose thereof around the pivotally supported lower end of the boom. At the same time, the lower end of the swing arm pivotally mounted to the nose part of the boom arm will also be moved along a circular path or locus. This known arrangement results in considerable inconvenience in handling these types of cranes, for example, during transportation of cargo or when digging or excavating in the field of construction work.

According to the present invention, these inconveniences and disadvantages can be completely overcome. In this regard it is noted that in practice it would be far more easy to carry or move cargo on a crane along a straight line path connecting two points than to carry or move it along a curved path or locus because in the latter case, it is difficult for the crane operator to predict the path of movement.

As another example in case of digging or excavating by means of a shovel attached to the lower end of a swing arm, it is impossible to dig the bottom of a particular digging location or ditch horizontally to the predetermined horizontal level or border line due to the curved path or locus of movement of the shovel. According to the present invention, however, it is easy to meet above requirements because of the straight movement of the shovel, that is imparting a straight movement or displacement to point E will never fail to impart a straight movement or displacement to the working point F.

Turning to a more detailed description of FIG. 1, it will be seen that there is provided an arrangement of rod members $\overline{A'C'}$ and $\overline{C''F'}$, shown in broken lines in FIG. 1, which have the same length as and which are disposed parallel to boom arm $\overline{AC}$ and swing arm $\overline{CF}$ respectively. The rod members $\overline{A'C'}$ and $\overline{C''F'}$ are pivotally associated with and parallel to boom arm $\overline{AC}$ and swing arm $\overline{CF}$ respectively in order to maintain the attitude of an arm member $\overline{CC''}$ horizontal or at a certain angle by aid of a joint part which is provided at the connection between the boom arm $\overline{AC}$ and the swing arm $\overline{CF}$. Base pivots A and A' of the boom arms $\overline{AC}$ and rod member $\overline{A'C'}$ respectively may be kept in fixed positions because both pivots A and A' are located on fixed parts of the crane post. As for the assumption made as regards $\overline{AC}=\overline{A'C'}$ and $\overline{AA'}=\overline{CC'}$, then $\overline{AA'}=\overline{CC'}$ can be attained regardless of the up and down movement of the tip end of the boom arm.

If the position of point C'' is so chosen within the joint member which includes $\overline{CC'}$ that the arm member CC'' may be maintained horizontal or at a certain angle regardless of the up and down movement of boom arms AC and $\overline{A'C'}$, the interior angle $\theta$ between arm members $\overline{CC'}$ and $\overline{CC''}$ will be constant because they are located on a fixed line within the single joint member. Line $\overline{CC''}$ may be directed in a direction which has a fixed angle relative to fixed arm $\overline{AA'}$ and hence be maintained horizontal or at a certain angle regardless of the movement of the boom arm.

$\overline{FF'}$ is always parallel to $\overline{CC''}$, and if $\overline{FF'}$ is so slanted or disposed at a particular desired angle for supporting a cargo or other load, $\overline{CC''}$ and $\overline{FF''}$ will maintain the same fixed angle accordingly regardless of the pivotal movement of the boom arm. Therefore, any cargo hung or suspended from the lower end $\overline{FF'}$ of swing arm CF may be carried at a stable attitude which will result in much more easier handling of cargoes due to the straight line path or locus of the lower end of swing arm CF as previously described.

Furthermore, according to the present invention, the associated arm joint member E may be driven or displaced by means of a hydraulic driving device, such that there is thereby provided a controlling apparatus which can operate at any desired positions, such as those of a hanging or suspended member attached to the lowest end of the swing arm or a post of a crane. Therefore, the controlling system is applicable for controlling a robot when the mechanism of the invention is used as a robot considering the boom and swing arms as a robot arm and the joint member E as a joint of a robot arm providing the controlling apparatus on a post of a crane or robot body. The change of position or displacement of joint member E caused by the hydraulic controlling device is small in comparison to an enlarged or greater change of position or displacement of cargo at the lowest end of the swing arms. The small required displacement of joint member E which provides the automatic controlling arrangement is one of the superior effects of the present invention.

Figure 2:
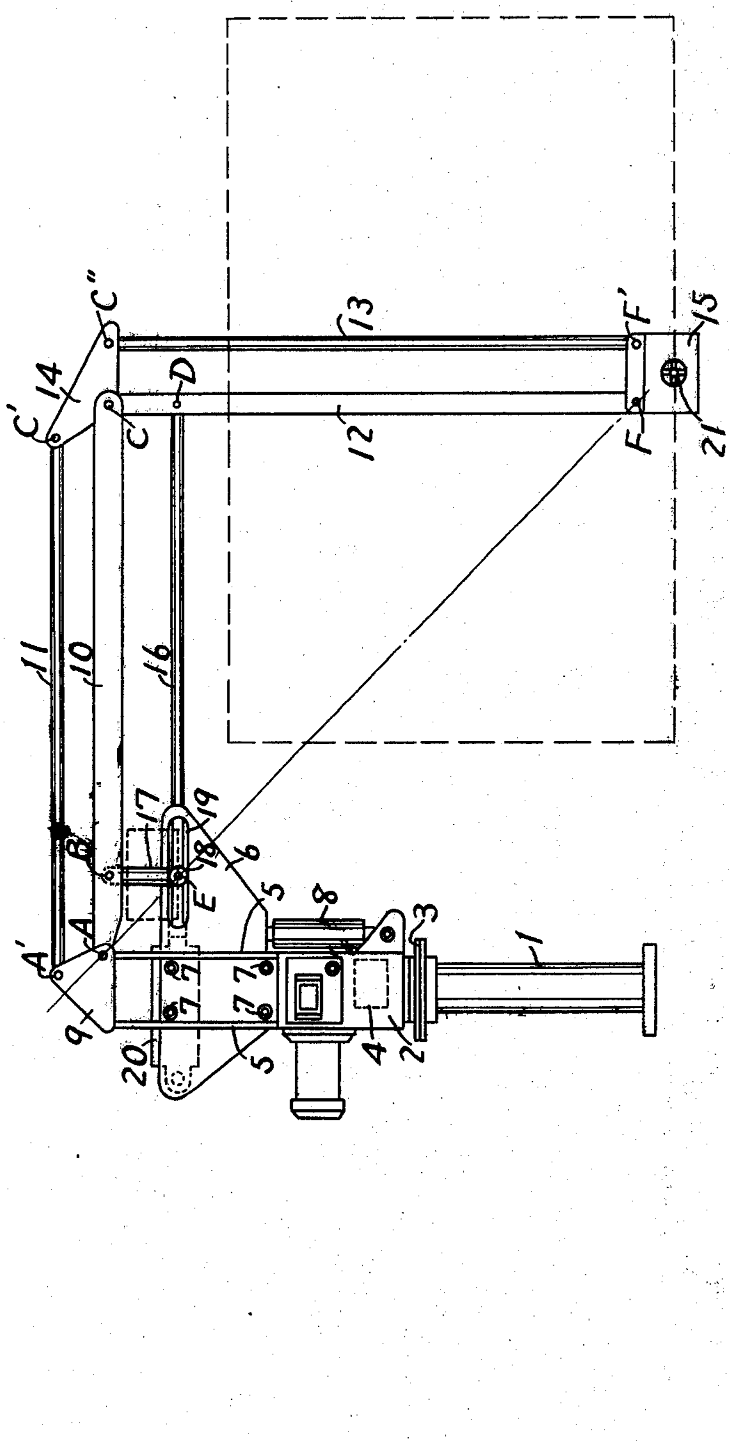
FIG. 2 is an elevational view of a crane mechanism according to one embodiment of the present invention.

Referring now to a preferred embodiment of the present invention shown in FIG. 2, a detailed explanation will now be set forth. In FIG. 2, numeral 1 designates a fixed support of a crane mechanism which will be hereinafter described. The support 1 may be movably mounted in some cases whereby the complete mechanism would be considered a robot hand with the support 1 corresponding to a body. Numeral 2 is a rotatable support or a rotatable body which is pivotally mounted on the fixed support 1 by means of bearing member 3 interposed therebetween and having a hydraulic power means for driving the crane mechanism. Numeral 6 is an elevator body which is mounted on the upper part of the rotatable support 2.

Numeral 5 represents a set of rails for guiding the elevator body 6 and these rails 5 are attached above the rotatable support 2. Numeral 7 illustrates a set of wheels which are provided for running along the set of rails 5 and are pivotally mounted to the sides of the elevator body 6. Numeral 8 represents a hydraulic cylinder for elevating the elevator body 6 with the upper end thereof being pivotally connected to the bottom of the elevator body 6 and the lower end thereof to the lower end of the side member of the rotatable support 2. Numeral 9 represents a head member functioning as a connecting member to which are connected by pivot pins A and A' an inner boom arm 10 and an outer boom arm 11 respectively both of which have the same length. Numeral 14 represents a pair of connection members which also have pivot pins C' and C and which are spaced apart the same as that between pivot pins A' and A. The connecting members 14 have another pivot pin C'' which is located on the line extending horizontally or at certain fixed angle from pin C.

Numerals 12 and 13 represent inner and outer swing arms of equal length and which are pivotally connected to the connecting members 14 by means of the pins C and C''. Numeral 15 represents swing means which is hung or mounted by two sets of pins F and F' from the lower end of swing arms 12, 13. The distance between pins F and F' is the same as the distance between C and C''.

Numerals 16 and 17 illustrate a set of associated arms which are so arranged that the length of arm 16 is the same as the part BC of the boom arm 10 and the length of arm 17 is the same as the part CD of the swing arm 12. The associated arm 16 is parallel to the boom arm 10 and is pivotally connected to the swing arm 12 at D. The associated arm 17 is parallel to the swing arm 12 and is pivotally connected to the boom arm 10 at B.

Letter E represents a set of connected pins which pivotally connect the ends of the associated arms 16 and 17, while numeral 18 represents a wheel which is coaxially disposed with respect to the pin E. Numeral 19 represents a window or opening provided on elevator body 6 for guiding the wheel 18. Numeral 20 illustrates a hydraulic cylinder for driving or displacing the pin E horizontally. The driving end of the hydraulic cylinder 20 is pivotally connected to the upper left part of the elevator body 6 as shown in FIG. 2, and the other end is also pivotally connected to pin E. Numeral 21 represents a handle attached to swing member 15 so that the hydraulic cylinders 8 and 20 may be controlled thereby as an operator moves the handle.

Figure 3:
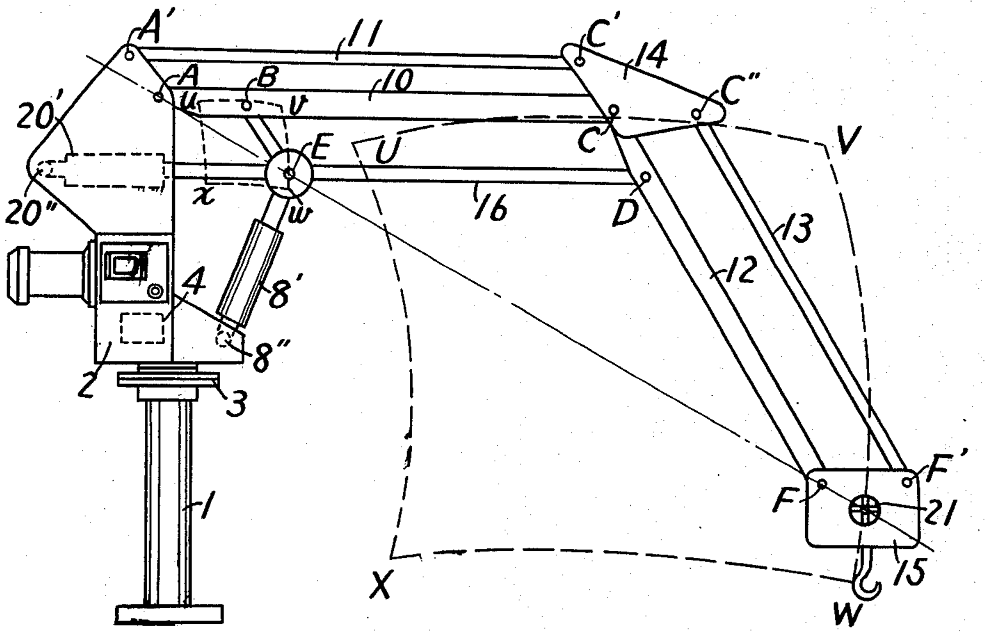
FIG. 3 is an elevational view of a crane mechanism according to another embodiment of the present invention.

FIG. 3 shows another preferred embodiment of the present invention. In the previously described embodiment shown in FIG. 2, horizontal drive or displacement is imparted directly to pin E by means of a hydraulic cylinder 20 while vertical drive or displacement is imparted to pin E indirectly by means of the elevator body 6 driven by the hydraulic cylinder 8. The embodiment shown in FIG. 3 is a modification of the embodiment shown in FIG. 2 whereby in FIG. 3, there is an abbreviation of the elevator body and also in FIG. 3 the two sets of hydraulic cylinders 8' and 20' are pivotally mounted on a rotatable support 2 by means of pins 8'' and 20'' respectively as shown in FIG. 3. Both ends of the piston rods of the hydraulic cylinders 8' and 20' are also pivotally connected together to pin E in order to drive the point or pin E within a vertical plane to cause a rotary motion in which pins 8'' and 20'' are the center of rotation.

As will be readily understood, the embodiment shown in FIG. 2 and that shown in FIG. 3 do not much differ from one another provided the length E 20'' and E 8'' are made relatively longer in comparison with the movable length of the piston rods of the hydraulic cylinder 20' or 8', whereby the paths *uv*, *vw*, *wx*, and *xu* described by the moving end of one of the piston rods of one cylinder as the length of the other cylinder is kept constant, and vice versa, are substantially or practically equal to straight line paths between their points *u*, *v*, *w*, and *x*.

The functions of the boom arms 10 and 11, the swing arms 12 and 13 and the other members are the same as those of the embodiment shown in FIG. 2. In both embodiments, pins C are used for connecting boom arms 10 and swing arms 12 to connecting member 14. Alternatively two pins may be used for separately connecting the end of boom arms 10 and swing arms 12 at positions near to each other on the connecting member 14, that is, if the distance between those pins is made negligibly smaller than those of boom arms 10 and swing arms 12. With this alternative arrangement easy connection of both arms 10 and 12 to connecting member 14 can be achieved and hence proper determination for designing the proper pin strength can be achieved without changing very much the enlargement ratio of the pantograph mechanism.

In the above described embodiments, handle 21 is provided near the swing member 15 so that any operator can control the hydraulic apparatus thereby. It goes without saying that, as is the case with known crane handles, an operator's control box may also be provided on the rotationaly movable post wherein an operating handle is provided on the control box to serve the same function as mentioned above.

When the handle 21 provided on the swing member 15 is moved vertically up and down, the hydraulic cylinder 8 is driven to cause its piston to be projected or retracted. Horizontal movement of handle 21 will cause hydraulic cylinder 20 to operate resulting in its piston being projected or retracted.

For the purposes of understanding the pantograph mechanism, a brief description will be set forth as follows. Vertical movement of handle 21, after the piston rod of hydraulic cylinder 20' is made to project to its maximum length, will cause pin E to move along the larger circle portion vw around the pin 20'' as is shown in FIG. 3. Thus it will be seen that the rectangular figure shown by broken lines uvwx in FIG. 3 is a locus of pin E when either hydraulic cylinder 8' or 20' is driven after the remaining cylinder is made to project to its maximum length or its minimum length. It is, of course, possible to move pin E along a diagonal straight path by driving both of the hydraulic cylinders through the slanted movement of the handle 21. In short, pin F will never fail to move accordingly as the movement of pin E. Because pins A, E, F are located on a straight line, the movement of pin E along the broken rectangular lines *u v w x* shown in FIG. 3 will cause the movement of pin F along the broken rectangular lines UVWX which is an enlarged similar figure of the former rectangular figure *u v w x* as described above. In this case, the driving force imparted to pin E by hydraulic cylinders 8' and 20' will be transmitted to pin F which, therefore, can carry cargo hung or suspended from the swing member 15. Furthermore, as described above, the posture or position of the cargo may be maintained constant, that is, horizontally or at a certain fixed angle.

According to the present invention, attitude of the lowest end of the swing member can be maintained to move horizontally or at a certain fixed angle, hence any cargo can be carried in a stable attitude regardless of the movement of the boom arm. This results in easy handling of cargo. The crane mechanism of the present invention can also be used for land readjustment machines or land excavating machines due to the horizontal movement and the constant posture thereof if the hung load is changed for a suitable shovel. Another advantage of the mechanism according to the present invention is the fact that a relatively smaller size of hydraulic apparatus can be used to get a relatively larger motion of the swing member due to the diagraph action of its mechanism. Still another advantage is, as has been described above, that the swing member can be moved along a straight line which will provide an operator far more ease in handling in comparison with that of conventional cranes. Furthermore, with the crane according to the present invention, an operator near the swing member can handle any cargo with ease by means of the hydraulic apparatus controlled by the handle provided on the swing member, or any other place on the crane member.

It is to be understood that the form of my invention herein shown and described is to be taken as a preferred example of the same and that various changes in the shape, size and arrangement of parts may be restored to without departing from the spirit of my invention or the scope of the appended claims.

What is claimed is:

1. A hydraulic crane mechanism comprising a vertically disposed post, support means, rotatably mounted on said post, inner and outer parallel boom arms of equal length pivotally connected at spaced locations on said support means, a connecting member pivotally connected to said boom arms such that the latter are maintained in spaced parallel disposition, inner and outer parallel and equal length swing arms pivotally connected to said connecting member, said pivotal connection of said inner boom arm to said connecting member having a common pivot axis with the pivotal connection of said inner swing arm to said connecting member, a swing means pivotally connected to said swing arms such that the latter are maintained in spaced parallel disposition, a first and second associated arm, pin means pivotally connecting said first and second associated arms, said first associated arm being pivotally connected to an intermediate section of said inner boom arm and being disposed parallel to said swing arms, said second associated arm being pivotally connected to an intermediate section of said inner swing arm and being disposed parallel to said boom arms, said inner boom arm being closer to said pin means than said outer boom arm, said inner swing arm being closer to said pin means than said outer swing arm such that portions of said inner boom arm and said inner swing arm along with said two associated arms form a pantograph with said outer boom arm and said outer swing arm being disposed outside of said pantograph, operable means for displacing said pin means, said operable means comprising a first hydraulic piston means having one operable end pivotally mounted on said support means and its other operable end pivotally connected to said pin means, said first hydraulic piston means having its longitudinal axis generally horizontally disposed whereby extension and contraction of said hydraulic piston means effects a corresponding displacement of said pin means and a corresponding but larger displacement of said swing means, said operable means further comprising a second hydraulic piston means having one operable end pivotally mounted on said support means and its other operable end pivotally connected to said pin means, said second hydraulic piston means having its longitudinal axis generally vertically disposed, whereby extension and retraction of said second hydraulic piston means effects displacement of said pin means and a corresponding but larger displacement of said swing means, said pin means being supported exclusively by said first and second hydraulic piston means such that said first and second hydraulic piston means are operable to freely displace said pin means, whereby displacement of the latter effects a greater displacement of said swing means.

* * * * *